US009200913B2

(12) United States Patent
Sano et al.

(10) Patent No.: US 9,200,913 B2
(45) Date of Patent: Dec. 1, 2015

(54) USER INTERFACE FOR PREDICTIVE TRAFFIC

(75) Inventors: Darrell Sano, Oakland, CA (US); Kevin Tsurutome, San Francisco, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 835 days.

(21) Appl. No.: 12/588,145

(22) Filed: Oct. 6, 2009

(65) Prior Publication Data

US 2010/0088020 A1  Apr. 8, 2010

Related U.S. Application Data

(60) Provisional application No. 61/136,827, filed on Oct. 7, 2008.

(51) Int. Cl.
| | | |
|---|---|---|
| G01C 21/00 | (2006.01) | |
| G08G 1/00 | (2006.01) | |
| G01C 21/34 | (2006.01) | |
| G08G 1/0969 | (2006.01) | |

(Continued)

(52) U.S. Cl.
CPC .......... *G01C 21/3492* (2013.01); *G08G 1/0969* (2013.01); *G08G 1/096827* (2013.01); *G01C 21/3415* (2013.01); *G01C 21/3691* (2013.01); *G08G 1/096844* (2013.01)

(58) Field of Classification Search
CPC ............... G01C 21/26; G01C 21/3415; G01C 21/3492; G01C 21/36; G01C 21/3605; G01C 21/367; G01C 21/3691; G08G 1/096827; G08G 1/096838; G08G 1/096844; G08G 1/096866; G08G 1/0969

USPC ......... 701/117–119, 400, 410, 414, 416, 423, 701/465, 532; 340/995.1, 995.13, 995.19, 340/995.21, 995.23, 539.11
See application file for complete search history.

(56) References Cited

U.S. PATENT DOCUMENTS

| 5,263,136 A | 11/1993 | DeAguiar |
|---|---|---|
| 5,359,529 A | 10/1994 | Snider |

(Continued)

FOREIGN PATENT DOCUMENTS

| EP | 1128163 | 8/2001 |
|---|---|---|
| JP | 2008 039698 | 2/2008 |

(Continued)

OTHER PUBLICATIONS

PCT International Search Report in PCT/US2009/05487 dated Nov. 17, 2009.

(Continued)

*Primary Examiner* — Jack W Keith
*Assistant Examiner* — Chuong P Nguyen
(74) *Attorney, Agent, or Firm* — William H. Bollman

(57) ABSTRACT

A navigation device includes a predictive traffic data database to store predictive traffic data at a plurality of times and a map database to store mapping data. A mapping module calculates a route and an estimated time of traversal for a route between a beginning geographic location and an ending geographic location based on the predictive traffic data and the mapping data. A start time modification module monitors for a modification of a start time for the route, with the mapping module re-calculating the estimated time of traversal in response to the modification of the start time for the route.

20 Claims, 5 Drawing Sheets

(51) Int. Cl.
  *G01C 21/36* (2006.01)
  *G08G 1/0968* (2006.01)

(56) References Cited

U.S. PATENT DOCUMENTS

| | | | |
|---|---|---|---|
| 5,832,408 A | 11/1998 | Tamai | |
| 6,064,941 A | 5/2000 | Nimura | |
| 6,119,013 A | 9/2000 | Maloney | |
| 6,256,577 B1* | 7/2001 | Graunke | 701/117 |
| 6,317,686 B1* | 11/2001 | Ran | 701/533 |
| 6,401,034 B1 | 6/2002 | Kaplan | |
| 6,424,912 B1 | 7/2002 | Correia | |
| 6,434,482 B1 | 8/2002 | Oshida | |
| 6,470,189 B1 | 10/2002 | Hill | |
| 6,480,783 B1* | 11/2002 | Myr | 701/117 |
| 6,487,495 B1 | 11/2002 | Gale | |
| 6,507,785 B1 | 1/2003 | Stefan | |
| 6,529,143 B2 | 3/2003 | Mikkola | |
| 6,571,169 B2 | 5/2003 | Miyaki | |
| 6,587,782 B1 | 7/2003 | Nocek | |
| 6,636,803 B1 | 10/2003 | Hartz | |
| 6,671,424 B1 | 12/2003 | Skoll | |
| 6,714,205 B1 | 3/2004 | Miyahita | |
| 6,820,092 B2 | 11/2004 | Nakano | |
| 6,940,407 B2 | 9/2005 | Miranda-Knapp | |
| 6,954,697 B1 | 10/2005 | Smith | |
| 7,054,743 B1 | 5/2006 | Smith | |
| 7,093,286 B1 | 8/2006 | King | |
| 7,155,339 B2 | 12/2006 | Tu | |
| 7,373,246 B2 | 5/2008 | O'Clair | |
| 7,379,729 B2 | 5/2008 | Holland | |
| 7,409,219 B2 | 8/2008 | Levitan | |
| 7,480,566 B2 | 1/2009 | Laverty | |
| 7,546,202 B2 | 6/2009 | Oh | |
| 7,609,176 B2* | 10/2009 | Yamane et al. | 340/994 |
| 7,627,656 B1 | 12/2009 | Anand et al. | 709/220 |
| 7,706,977 B2 | 4/2010 | Soehren | |
| 7,797,100 B2* | 9/2010 | Zaitsu et al. | 701/117 |
| 7,853,403 B2* | 12/2010 | Tanaka | 701/414 |
| RE42,927 E | 11/2011 | Want | |
| 8,095,434 B1 | 1/2012 | Puttick | |
| 8,190,359 B2* | 5/2012 | Bourne | 701/410 |
| 8,265,864 B1 | 9/2012 | Kaufman | |
| 8,296,062 B2* | 10/2012 | Yamane et al. | 701/432 |
| 8,566,025 B2* | 10/2013 | Yun | 701/411 |
| 2001/0021894 A1 | 9/2001 | Sakamoto | |
| 2001/0038626 A1 | 11/2001 | Dynarski | |
| 2001/0047241 A1 | 11/2001 | Khavakh | |
| 2002/0021231 A1 | 2/2002 | Schlager | |
| 2002/0037716 A1 | 3/2002 | McKenna | |
| 2002/0042819 A1 | 4/2002 | Reichert | |
| 2002/0082774 A1 | 6/2002 | Bloebaum | |
| 2002/0098851 A1 | 7/2002 | Walczak | |
| 2002/0190861 A1 | 12/2002 | Wentworth | |
| 2003/0033083 A1 | 2/2003 | Nakashima | |
| 2003/0055555 A1 | 3/2003 | Knockheart | |
| 2003/0071728 A1 | 4/2003 | McDonald | |
| 2003/0095525 A1 | 5/2003 | Lavin | |
| 2003/0128211 A1 | 7/2003 | Watanabe | |
| 2003/0182052 A1 | 9/2003 | Delorme | |
| 2004/0003125 A1 | 1/2004 | Ichimura | |
| 2004/0023645 A1 | 2/2004 | Olsen | |
| 2004/0027258 A1 | 2/2004 | Pechatnikov | |
| 2004/0030493 A1 | 2/2004 | Pechatnikov | |
| 2004/0135784 A1 | 7/2004 | Cohen | |
| 2004/0158829 A1 | 8/2004 | Beresin | |
| 2004/0185870 A1 | 9/2004 | Matsuda | |
| 2004/0203603 A1 | 10/2004 | Pierce | |
| 2004/0203873 A1 | 10/2004 | Gray | 455/456.1 |
| 2004/0215641 A1 | 10/2004 | Kuthuri | |
| 2004/0217980 A1 | 11/2004 | Radburn | |
| 2004/0224702 A1 | 11/2004 | Chaskar | |
| 2004/0225437 A1* | 11/2004 | Endo et al. | 701/209 |
| 2004/0249568 A1* | 12/2004 | Endo et al. | 701/209 |
| 2005/0148342 A1 | 7/2005 | Sylvain | |
| 2005/0149253 A1 | 7/2005 | Nambata | |
| 2005/0188333 A1 | 8/2005 | Hunleth | |
| 2005/0251331 A1 | 11/2005 | Kreft | |
| 2005/0288033 A1 | 12/2005 | McNew | |
| 2006/0015513 A1 | 1/2006 | Poyhonen et al. | 707/100 |
| 2006/0023626 A1 | 2/2006 | Krausz | |
| 2006/0055693 A1 | 3/2006 | Sylthe | |
| 2006/0064235 A1* | 3/2006 | Ishikawa et al. | 701/117 |
| 2006/0089788 A1 | 4/2006 | Laverty | |
| 2006/0089792 A1 | 4/2006 | Manber | |
| 2006/0105782 A1 | 5/2006 | Brock | |
| 2006/0116818 A1 | 6/2006 | Chao et al. | 701/211 |
| 2006/0135178 A1 | 6/2006 | Allyn | |
| 2006/0155679 A1 | 7/2006 | Kothuri | |
| 2006/0167616 A1* | 7/2006 | Yamane et al. | 701/117 |
| 2006/0167621 A1 | 7/2006 | Dale | |
| 2006/0174209 A1 | 8/2006 | Barros | |
| 2006/0200304 A1 | 9/2006 | Oh | |
| 2006/0200308 A1 | 9/2006 | Arutunian | |
| 2006/0206586 A1 | 9/2006 | Ling | |
| 2006/0223518 A1 | 10/2006 | Haney | |
| 2006/0229802 A1 | 10/2006 | Vertelney | |
| 2006/0246922 A1 | 11/2006 | Gasbarro | |
| 2006/0253247 A1 | 11/2006 | De Silva et al. | |
| 2006/0287818 A1* | 12/2006 | Okude et al. | 701/209 |
| 2007/0010942 A1 | 1/2007 | Bill | |
| 2007/0015518 A1 | 1/2007 | Winter | |
| 2007/0036318 A1 | 2/2007 | Gits et al. | 379/202.01 |
| 2007/0072620 A1 | 3/2007 | Levitan | |
| 2007/0083557 A1 | 4/2007 | Leiserowitz | |
| 2007/0083649 A1 | 4/2007 | Zuzga | |
| 2007/0118520 A1 | 5/2007 | Bliss | |
| 2007/0153983 A1 | 7/2007 | Bloebaum | |
| 2007/0156334 A1 | 7/2007 | Vu | |
| 2007/0174259 A1 | 7/2007 | Amjadi | |
| 2007/0208492 A1* | 9/2007 | Downs et al. | 701/117 |
| 2007/0208497 A1* | 9/2007 | Downs et al. | 701/117 |
| 2007/0208498 A1* | 9/2007 | Barker et al. | 701/117 |
| 2007/0213043 A1 | 9/2007 | Son | 455/422.1 |
| 2007/0219706 A1 | 9/2007 | Sheynblat | |
| 2007/0219708 A1 | 9/2007 | Brasche | |
| 2007/0233817 A1 | 10/2007 | Johnson | |
| 2007/0238472 A1 | 10/2007 | Wanless | |
| 2007/0239752 A1 | 10/2007 | Beitman | |
| 2007/0253642 A1 | 11/2007 | Berrill | |
| 2007/0281690 A1 | 12/2007 | Altman | |
| 2007/0288613 A1 | 12/2007 | Sudame et al. | 709/223 |
| 2007/0298812 A1 | 12/2007 | Singh | |
| 2008/0004043 A1 | 1/2008 | Wilson | |
| 2008/0071465 A1* | 3/2008 | Chapman et al. | 701/117 |
| 2008/0082262 A1 | 4/2008 | Silva et al. | |
| 2008/0112551 A1 | 5/2008 | Forbes et al. | 379/142.1 |
| 2008/0130597 A1 | 6/2008 | Kalhan | 370/338 |
| 2008/0139114 A1 | 6/2008 | Ranganathan | 455/41.1 |
| 2008/0140307 A1 | 6/2008 | Chen | |
| 2008/0177462 A1 | 7/2008 | Yoshioka | |
| 2008/0177839 A1 | 7/2008 | Chang | |
| 2008/0218407 A1 | 9/2008 | Norda | |
| 2008/0249983 A1 | 10/2008 | Meisels | |
| 2008/0261560 A1 | 10/2008 | Ruckart | 455/411 |
| 2008/0268822 A1 | 10/2008 | Johnson | |
| 2008/0270366 A1 | 10/2008 | Frank | |
| 2008/0275637 A1 | 11/2008 | Kim | |
| 2008/0280599 A1 | 11/2008 | Cheng | |
| 2008/0307445 A1 | 12/2008 | Garg | 719/328 |
| 2008/0319652 A1 | 12/2008 | Moshfeghi | |
| 2008/0319653 A1 | 12/2008 | Moshfeghi | |
| 2009/0009397 A1 | 1/2009 | Taylor | |
| 2009/0029693 A1 | 1/2009 | Liwell | |
| 2009/0055087 A1 | 2/2009 | Beacher | |
| 2009/0061852 A1 | 3/2009 | Feher | |
| 2009/0144247 A1 | 6/2009 | Wistrand et al. | |
| 2009/0192702 A1* | 7/2009 | Bourne | 701/200 |
| 2009/0237307 A1 | 9/2009 | Tsai | |
| 2009/0325615 A1 | 12/2009 | Mckay | |
| 2010/0037057 A1 | 2/2010 | Shim et al. | |
| 2010/0094550 A1 | 4/2010 | Tsurutome et al. | |
| 2011/0003578 A1 | 1/2011 | Chen et al. | |

(56) References Cited

U.S. PATENT DOCUMENTS

| | | | |
|---|---|---|---|
| 2011/0035141 A1* | 2/2011 | Barker et al. | 701/119 |
| 2011/0118965 A1* | 5/2011 | Aben et al. | 701/117 |
| 2014/0058652 A1* | 2/2014 | Duan et al. | 701/117 |

FOREIGN PATENT DOCUMENTS

| | | |
|---|---|---|
| WO | WO2006/071271 | 7/2006 |
| WO | WO2006/125291 | 11/2006 |

OTHER PUBLICATIONS

U.S. Appl. No. 11/251,766, filed Oct. 2005, Barcklay.

International Search Report in PCT/US2009/05486 dated Jan. 21, 2010.

International Search Report in PCT/US2008/10543 dated Aug. 19, 2010.

International Search Report in PCT/US2008/10542 dated Aug. 19, 2010.

Ahern et al., "World Explorer: Visualizing Aggregate Data from Unstructured Text in Geo-Referened Collections," Jun. 18-23, 2007, ACM, JCDL'07.

European Search Report received in European Appl. No. 09819547.2 dated Oct. 16, 2012.

European Search Report received in European Appl. No. 09819546.4 dated Oct. 15, 2012.

John Krumm et al, "Map Matching with Travel Time Constraints", SAE 2007 World Congress, Apr. 19, 2007.

* cited by examiner

USER INTERFACE FOR PREDICTIVE TRAFFIC

The present invention claims priority from U.S. Provisional Application 61/136,827, filed Oct. 7, 2008, entitled "USER INTERFACE FOR PREDICTIVE TRAFFIC", to SANO et al., the entirety of which is expressly incorporated herein by reference.

BACKGROUND OF THE INVENTION

1. Field of the Invention

This invention relates generally to navigation devices. More particularly, it relates to location based services (LBS), and navigation services based on predictive traffic data.

2. Background of the Related Art

When traveling for business or leisure, a challenge always remains as how to gauge when to depart an origin to arrive at a destination on time. This challenge exists for business travelers who must attend a meeting on time, catch a flight, etc. Likewise, this challenge exists for non-business travelers, such as vacationers, who must arrive at an event, a dinner reservation, pick up children from a day care center or school, etc. In unfamiliar surroundings and roadways, the unknown factor that can cause delays greatly increases. People are either late or too early and must kill time. Traffic conditions only compound the problems associated with navigation timing to avoid being either late or too early.

Current technologies include traffic prompts or alerts, which do little to help a user determine when to leave for a given destination. Alerts may also describe conditions on unfamiliar roadways, but such information's impact is all but undecipherable and meaningless except to the local commuter. Alerts provide granular road-specific information, but what this information means in terms of an Estimated Time of Travel (ETT) and a resultant Estimated Time of Arrival (ETA), to a specific destination is unknown. If a user is unfamiliar with the local roadways, the impact on ETT and the resultant ETA is unknown.

Navigation products today include real time traffic, and may generate alternate routes around adverse traffic conditions. However, this capability is useful only once the user has started driving on a route. In unfamiliar locations to unfamiliar destinations, the question still remains from a planning perspective of when a user should begin a drive. A user may desire to known what the drive time for a given route would be several hours from now. A user may want to know if they have multiple meetings in different locations, when to depart each location to insure that they arrive in a timely manner, not late and preferably not too early.

SUMMARY OF THE INVENTION

In accordance with the principles of the present invention, a navigation device is comprised of a predictive traffic data database to store predictive traffic data at a plurality of times and a map database to store mapping data. A mapping module calculates a route and an estimated time of traversal for the route between a beginning geographic location and an ending geographic location based on the predictive traffic data and the mapping data. A start time modification module monitors for a modification of a start time for the route. The mapping module re-calculates the estimated time of traversal in response to the modification of the start time for the route.

In accordance with another aspect of the invention, an apparatus and method of determining an estimated time of arrival for a route calculated by a navigation device includes calculating the route and the estimated time of traversal for the route between a beginning geographic location and an ending geographic location based on predictive traffic data and mapping data. A modification of a start time is monitoring for the route. The estimated time of traversal is re-calculating in response to the modification of the start time for the route.

DETAILED DESCRIPTION OF ILLUSTRATIVE EMBODIMENTS

The present invention provides predictive traffic data based navigation based on real time sampling of traffic patterns over an extended period of time, e.g., a year. Traffic pattern data trends are averaged over the course of an extended period of time to insure the best possible scenarios during seasonal travel patterns, weekly commute patterns, and hourly daily flow data. For example, driving time in September would most likely require longer time versus driving times for the same route in August when people are more frequently on vacation, and school traffic is absent.

Specific days may require added travel time, e.g., the day before Thanksgiving or other holiday, versus driving on the actual holiday itself. Hourly traffic data averages the flow during peak morning and evening commutes versus off-hour or mid-day driving. At any of these times, an easy to use, direct manipulation user interface disclosed herein allows a user to see traffic impact throughout the day, and preferably be prompted when to begin a drive based on traffic pattern averages.

Figure 1:
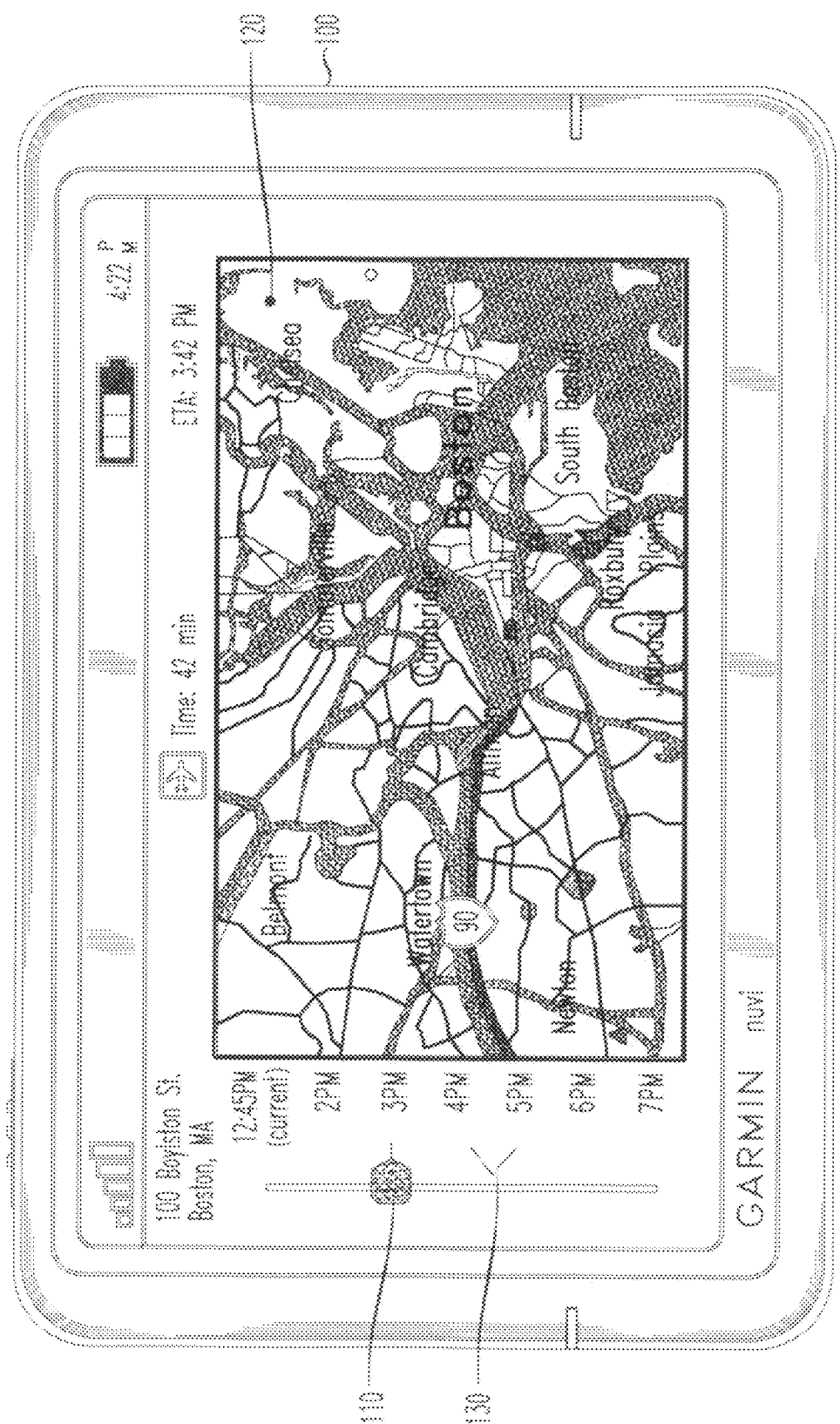
FIG. 1 shows a navigation device illustrating a traffic map with flow data and incidents based on current time and future times, in accordance with the principles of the present invention.

FIG. 1 shows a navigation device illustrating a traffic map with flow data and incidents based on current time and future times, in accordance with the principles of the present invention.

In particular, navigation device 100 includes a slide control 110 and a map viewing area 120. The slide control 110 allows a user to select various times of day. In particular, a user is able to select from a plurality of available time options 130 in the near future from their current time. In the example shown, a user is given time options 130 that span up to six hours into the future from their current time.

Once slide control 110 is moved to another time, the map viewing area 120 is updated with predictive traffic conditions. Moving the slide control up or down, e.g., dragging up or down with a finger on a tough pad or touch screen, slides the hours of the day forward or backward. In the example shown in FIG. 1, the current time is shown as being 12:45 PM mid-day, and the slide control 110 is set to 3 PM. With the slide control 110 set as shown in FIG. 1, traffic conditions shown in map viewing area 120 reflect predictive traffic conditions for that time of day. The ETT to a destination, e.g., to an airport, is calculated as approximately 42 minutes. The resultant ETA can be easily calculated from the ETA for display on the map viewing area 120.

Although the time options 130 shown in FIG. 1 are one hour increments, the increments can be adjusted within a configuration menu (not shown). For example, in some instances a use may desire to known if they leave for a trip later by 10 or 20 minutes. Near rush hour times, 10 or 20 minutes can result in significant traffic reductions or increases necessitating use of smaller increments for time options 130.

Figure 2:
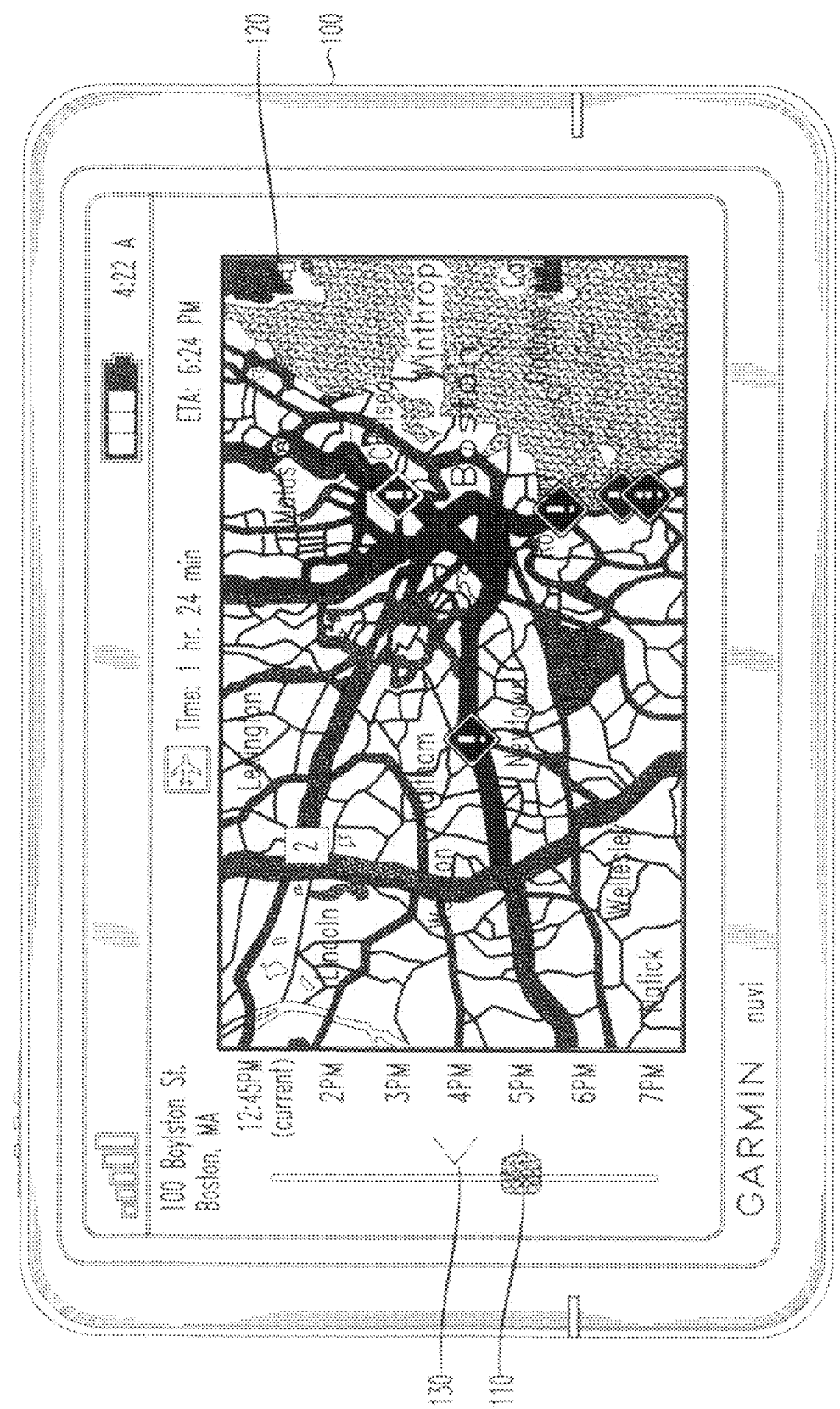
FIG. 2 shows a navigation device illustrating a traffic map with flow data and incidents at two hours into the future from that shown in FIG. 1, in accordance with the principles of the present invention.

FIG. 2 shows a navigation device illustrating a traffic map with flow data and incidents at two hours into the future from that shown in FIG. 1, in accordance with the principles of the present invention.

In particular, slide control 110 is shown after having been moved to another time. In the example shown in FIG. 2, the current time is still shown as being 12:45 PM mid-day, but the slide control 110 has been moved relative to the slide control 110 shown in FIG. 1 to predict an ETT for a delayed departure at 5 PM. With the slide control 110 set as shown in FIG. 2, traffic conditions shown in map viewing area 120 are updated to reflect predictive traffic conditions for the new time.

The ETT to the airport for FIG. 2 has now increased to 1 hr and 24 minutes versus the 42 min. ETT shown in FIG. 1. This information can be very significant, especially if a user has a flight at 5:15 PM and the ETT is 1 hr and 24 for a departure time of 5 PM. Using the navigation device 100 disclosed herein, a user is able to begin driving to a destination, e.g., airport, by 3 PM to make sure they are not late. Preferably, a route reminder alerts a driver to depart at a proper time, 3 PM for the example given in FIGS. 1 and 2.

Figure 3:
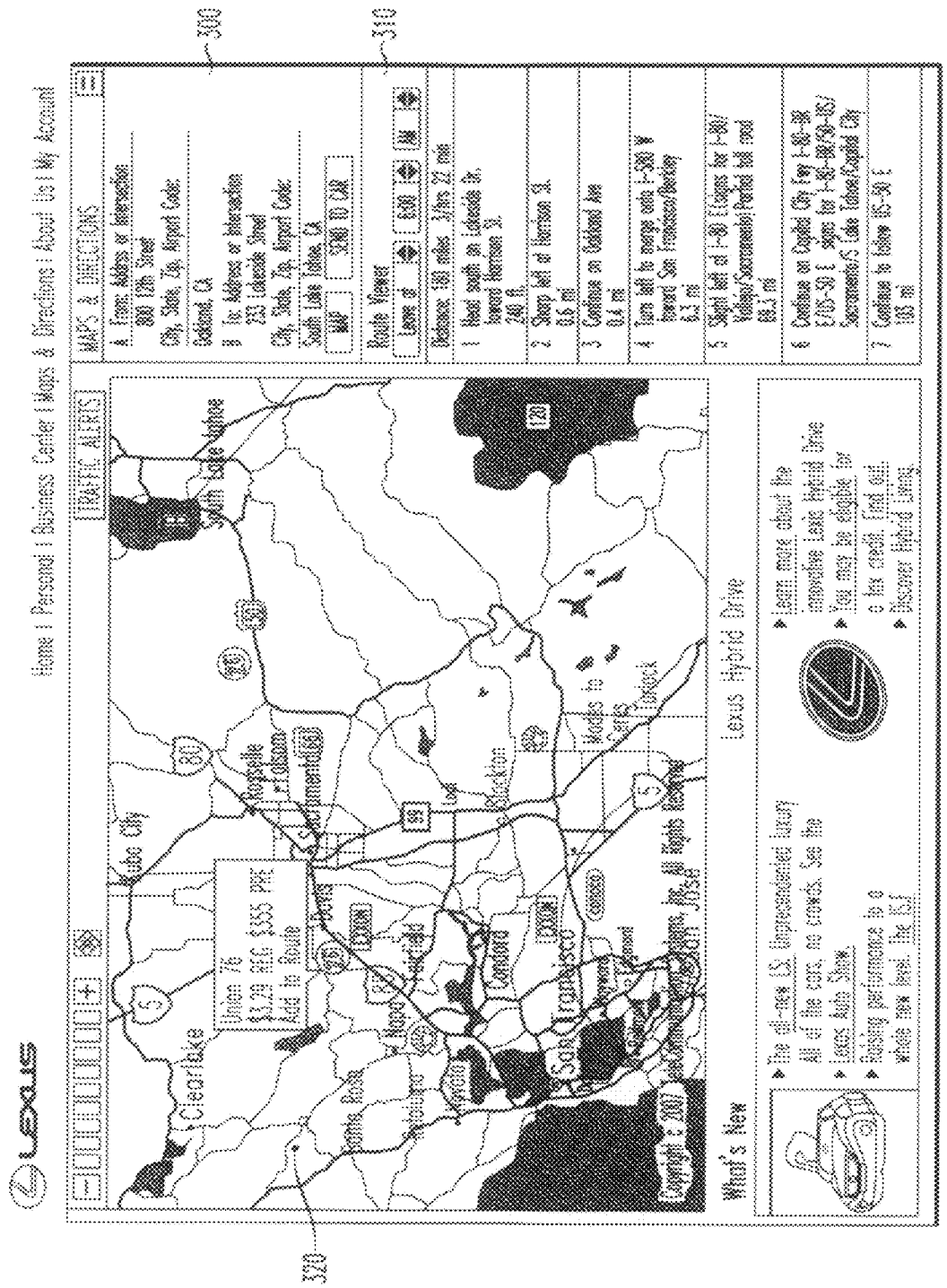
FIG. 3 shows an in-car navigation device illustrating a traffic map with flow data and incidents based on current time and future times, in accordance with the principles of the present invention.

FIG. 3 shows an in-car navigation device illustrating a traffic map with flow data and incidents based on current time and future times, in accordance with the principles of the present invention.

In particular, navigation device 300 that includes a route viewer selector window 310 and a map viewing area 320. The route viewer selector window 310 allows a user to select various times of day similar to the slide control 110 shown in FIGS. 1 and 2. A user is able to select from a plurality of available time options in the future from their current time to predict an ETT for a route at a different time than their current time based on predictive traffic conditions for a selected time.

In the example shown, a user has already entered their beginning geographic location and ending geographic location for route guidance. A user has selected, for the already calculated route guidance, to leave at 6 AM. For such a departure time and based on statistical traffic data, the navigation device 300 has calculated that traversal of the calculated route will take 3 hrs and 22 min. to traverse. Similarly to the slide control 110 shown in FIGS. 1 and 2, criteria within the route viewer selector window 310 can be modified to allow a user to determine an ETT for any given departure time.

Figure 4:
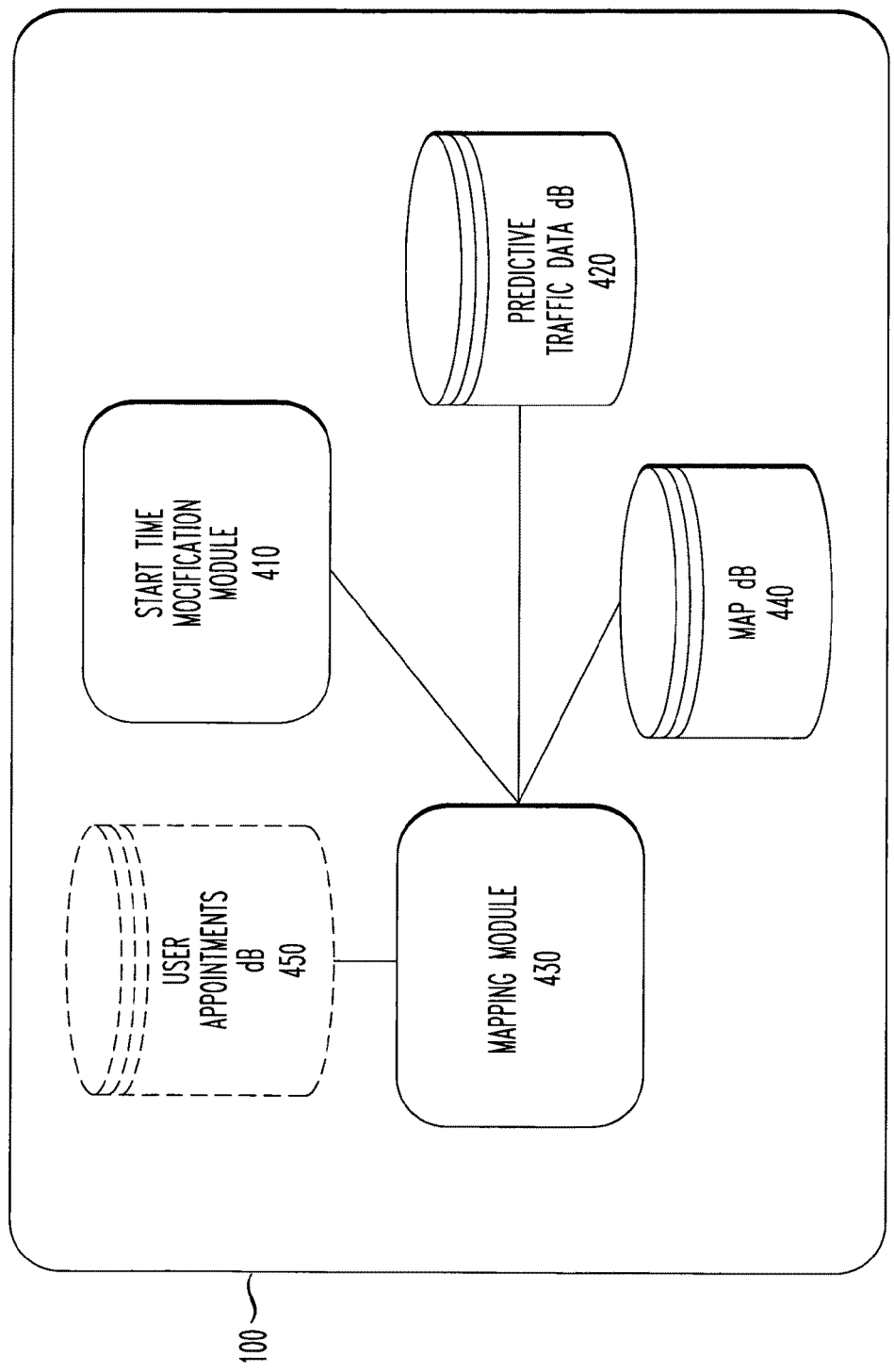
FIG. 4 shows a detailed view of the navigation device, in accordance with the principles of the present invention.

FIG. 4 shows a detailed view of the navigation device, in accordance with the principles of the present invention.

In particular, the navigation device 100 includes a start time modification module 410, a predictive traffic data database 420, and a mapping module 430. The navigation device 100 can further include an optional user appointments database 450.

Start time modification module 410 monitors for changes in a menu option area for the navigation device 100. In the examples shown in FIGS. 1-3, start time modification module 410 monitors for changes with slide control 110 and route viewer selector window 310. Start time modification module 410 triggers a re-calculation of an ETT based on a newly entered start time for route guidance.

Predictive traffic data database 420 stores predictive traffic patterns over an extended period of time for specific times periods. A database query submitted to the predictive traffic data database 420 based on a pre-determined route and a specific time of day results in predictive traffic patterns being returned to mapping module 430. Mapping module 430 can use the predictive traffic patterns for a given route to calculate or re-calculate an ETT for the given route.

Mapping module 430 maps a current location of the navigation device 110 or user defined locations for the navigation device 110 based on mapping data from map database 440, as is known within the art. However, in accordance with the principles disclosed herein the mapping module 430 further performs predictive mapping for the navigation device 110. Predictive mapping includes predicting an ETT for a given route for time periods either before or after a current time. Predictive traffic data that has been accumulated over an extended period of time, e.g., a year, provides data upon which navigation device 100 can predict an ETT for a given route at any time during that extended period.

User appointment(s) database 450 can store previously entered user appointments, similarly to how a personal data assistant (PDA) can store user appointments. However, in accordance with the principles disclosed herein the user appointment(s) database 450 provides user appointment(s) information in addition to location information and predictive traffic information as a basis from which to formulate predictive traffic information for specific geographic locations associated with the previously entered user appointment(s). The user appointment(s) from user appointment(s) database 450 can be used as geographic starting points or destination during route guidance formations.

Figure 5:
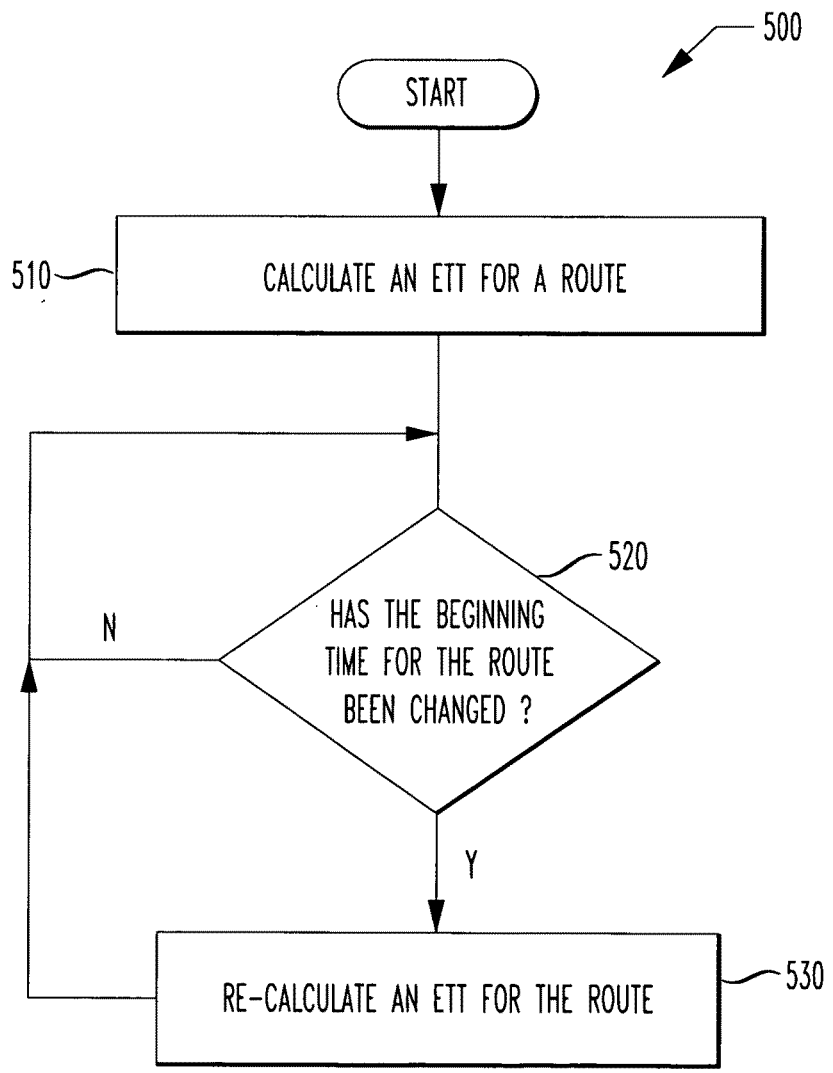
FIG. 5 shows a process for calculating an Estimated Time of Traversal (ETT) based on predictive traffic data, in accordance with the principles of the present invention.

FIG. 5 shows a process for calculating an Estimated Time of Traversal (ETT) based on predictive traffic data, in accordance with the principles of the present invention.

In particular, process 500 for calculating an ETT includes a step for calculating an ETT for a given route 510, a step for determining if the beginning time for the given route has been changed 520, and a step for re-calculating an ETT for a new time 530.

At step 510, the navigation device 100 has already acquired a beginning geographic location and an ending geographic location. The beginning geographic location and the ending geographic location can be acquired by the navigation device 100 through a variety of ways. A user can enter such information through appropriate menu options, pre-stored geographic locations, e.g., from user appointment(s) database 450, can be selected by a user through appropriate menu options, a beginning geographic location can be obtained from an on-board position determining determiner, e.g., Global Positioning System (GPS), a beginning geographic location can be obtained from a remote positioning center (not shown) that remotely determines the location of the navigation device 100, etc.

Optionally, the user appointment(s) database 450 can provide geographic location(s) from which an ETT is calculated for a route to one or more geographic locations retrieved from user appointment(s) database 450. In this manner a user, e.g., a salesperson, can select their route for a single appointment, e.g., a sales meeting, or routes for all of their appointments throughout the day that minimizes travel times based on the principles disclosed herein for route guidance based on predictive traffic patterns.

At step 510, mapping module 430 submits a database query to map database 440 to calculate a route between the beginning geographic location and the ending geographic location. Once a route is calculated between the beginning geographic location and the ending geographic location, mapping module 430 submits a database query to predictive traffic data database 420 to retrieve predictive traffic data for the calculated route. The predictive traffic data for the calculated route is used by the mapping module 430 to calculate an ETT for the calculated route. The ETT is displayed for a user of the navigation device 100.

Step 510 can be an optional step within process 500. The navigation device 100 can automatically calculate a route and an ETT for the beginning geographic location and the ending geographic location. Alternately, process 500 can go directly to step 520 and wait for a user to select a beginning time before calculation of an ETT for that route.

At step 520, a decision is made if a user has selected or re-selected a new beginning time for the route calculated in step 510. If the beginning time for the route calculated in step 510 has been changed by a user or a user enters a beginning time for the route for the first time, process 500 branches to step 530. Otherwise, if the beginning time for the route has not been changed, process 500 branches to step 520. Branching back to step 520 allows process 500 to continuously monitor for a change in a beginning time for a given route.

At step 530, mapping module 430 submits a database query to predictive traffic data database 420 to retrieve predictive traffic data for the calculated route. The predictive traffic data for the calculated route is used by the mapping module 430 to calculate an ETT for the calculated route. The new ETT is displayed for a user of the navigation device 100.

While the invention has been described with reference to the exemplary embodiments thereof, those skilled in the art will be able to make various modifications to the described embodiments of the invention without departing from the true spirit and scope of the invention.

What is claimed is:

1. A navigation device, comprising:
   a mapping module arranged to determine an overall day's route including each of a plurality of separate trips to different ending locations, each of said plurality of separate trips being separated in time over a day;
   a database to maintain said different ending locations, and to determine an estimated total travel time of traversal for said overall day's route between a beginning geographic location of a first one of said plurality of separate trips, and an ending geographic location of a last one of said plurality of separate trips, based on an average of real time sampling of traffic patterns over an extended period of time, mapping data, and a future start time for traversing said overall day's route;
   a graphical departure time control arranged to modify said future start time for said overall day's route; and
   a display arranged to prompt a best time to depart on said overall day's route based on said average of real time sampling of traffic patterns over said extended period of time;
   wherein said mapping module is arranged to re-determine said estimated total travel time of traversal for said overall day's route, and update a map viewing area with future predictive traffic condition information, in response to movement of said graphical departure time control.

2. The navigation device according to cairn 1, wherein:
   said navigation device is an in-car navigation device.

3. The navigation device according to claim 1, wherein:
   said navigation device is a portable navigation device.

4. The navigation device according to claim 1, wherein:
   said graphical departure time control modifies said future start time in a one hour increment.

5. The navigation device according to claim 1, wherein:
   said beginning geographic location is determined by a Global Positioning System (GPS) receiver attached to said navigation device.

6. The navigation device according to claim 1, further comprising:
   a map database to store said mapping data.

7. The navigation device according to claim 1, wherein:
   said real time sampling of traffic patterns is averaged over a year.

8. The navigation device according to claim 1, wherein:
   said real time sampling of traffic patterns generates an average traffic pattern for a given season.

9. The navigation device according to claim 1, wherein:
   said real time sampling of traffic patterns generates an average traffic pattern for a given weekly commute.

10. The navigation device according to claim 1, wherein:
    said real time sampling of traffic patterns generates an average traffic pattern for an hourly daily flow.

11. A method of determining an estimated total travel time of traversal for an overall day's route determined by a navigation device, comprising:
    determining said overall day's route including each of a plurality of separate trips to different ending locations, each of said plurality of separate trips being separated in time over a day;
    determining an estimated total travel time of traversal for said overall day's route between a beginning geographic location of a first one of said plurality of separate trips, and an ending geographic location of a last one of said plurality of separate trips, based on an average of real time sampling of traffic patterns over an extended period of time, mapping data, and a future start time for traversing said overall day's route;
    modifying, via a graphical control, said future start time for said overall day's route;
    re-determining said estimated total travel time of traversal in response to said modification of said graphical control; and
    prompting a best time to depart on said overall day's route based on said average of real time sampling of traffic patterns over said extended period of time.

12. The method of determining an estimated total travel time of traversal for an overall day's route determined by a navigation device according to claim 11, wherein:
    said navigation device is an in-car navigation device.

13. The method of determining an estimated total travel time of traversal for an overall day's route determined by a navigation device according to claim 11, wherein:
    said navigation device is a portable navigation device.

14. The method of determining an estimated total travel time of traversal for an overall day's route determined by a navigation device according to claim 11, wherein:
    said graphical control modifies said future start time in a one hour increment.

15. The method of determining an estimated total travel time of traversal for an overall day's route determined by a navigation device according to claim 11, further comprising:
    determining said beginning geographic location by a Global Positioning System (GPS) receiver in said navigation device.

16. Apparatus for determining an estimated total travel time of traversal for an overall day's route determined by a navigation device, comprising:

means for determining said overall day's route including each of a plurality of separate trips to different ending locations, each of said plurality of separate trips being separated in time over a day;

means for determining an estimated total travel time of traversal for said overall day's route between a beginning geographic location of a first one of said plurality of separate trips, and an ending geographic location of a last one of said plurality of separate trips, based on an average of real time sampling of traffic patterns over an extended period of time, mapping data, and a future start time for traversing said overall day's route;

means for modifying, via a graphical control, said future start time for said overall day's route;

means for re-determining said estimated total travel time of traversal in response to said modification of said graphical control; and display means for visually prompting a best time to depart on said overall day's route based on said average of real time sampling of traffic patterns over said extended period of time.

17. The apparatus for determining an estimated total travel time of traversal for an overall day's route determined by a navigation system according to claim 16, wherein:

said navigation device is an in-car navigation device.

18. The apparatus for determining an estimated total travel time of traversal for an overall day's route determined by a navigation system according to claim 16, wherein:

said navigation device is a portable navigation device.

19. The apparatus for determining an estimated total travel time of traversal for an overall day's route determined b navigation system according to claim 16, wherein:

said graphical control modifies said future start time in a one hour increment.

20. The apparatus for determining an estimated total travel time of traversal for an overall day's route determined by a navigation system according to claim 16, further comprising:

means for determining said beginning geographic location by a Global Positioning System (GPS) receiver in said navigation device.

* * * * *